US007006604B2

(12) United States Patent
Engelke

(10) Patent No.: US 7,006,604 B2
(45) Date of Patent: Feb. 28, 2006

(54) RELAY FOR PERSONAL INTERPRETER

(75) Inventor: Robert M. Engelke, Madison, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

(21) Appl. No.: 10/619,040

(22) Filed: Jul. 14, 2003

(65) Prior Publication Data

US 2004/0017897 A1    Jan. 29, 2004

Related U.S. Application Data

(63) Continuation of application No. 09/783,679, filed on Feb. 14, 2001, now Pat. No. 6,594,346, which is a continuation-in-part of application No. 09/288,420, filed on Apr. 8, 1999, now Pat. No. 6,233,314, which is a continuation of application No. 08/925,558, filed on Sep. 8, 1997, now Pat. No. 5,909,482.

(51) Int. Cl.
*H04M 1/64* (2006.01)
*H04M 3/00* (2006.01)

(52) U.S. Cl. ............. 379/52; 37/88.13; 37/88.14; 37/93.09; 37/93.05; 37/100.09; 37/100.13; 37/265.02

(58) Field of Classification Search .......... 379/52, 379/88.13, 88.14, 93.09, 93.05, 100.09, 100.13, 379/265.02, 37
See application file for complete search history.

(56) References Cited

U.S. PATENT DOCUMENTS 5,724,405 A * 3/1998 Engelke et al. ............... 379/52
6,594,346 B1 * 7/2003 Engelke ...................... 379/52

* cited by examiner

*Primary Examiner*—Allan Hoosain
(74) *Attorney, Agent, or Firm*—Quarles & Brady LLP

(57) ABSTRACT

A relay is described to facilitate communication through the telephone system between hearing users and users who need or desire assistance in understanding voice communications. To overcome the speed limitations inherent in typing, the call assistant at the relay does not type most words but, instead, re-voices the words spoken by the hearing user into a computer operating a voice recognition software package trained to the voice of that call assistant. The text stream created by the computer and the voice of the hearing user are both sent to the assisted user so that the assisted user can be supplied with a visual text stream to supplement the voice communications. A time delay in the transmission of the voice of the hearing user through the relay is of assistance to the assisted user in comprehending the communications session.

1 Claim, 3 Drawing Sheets

RELAY FOR PERSONAL INTERPRETER

CROSS-REFERENCE TO RELATED APPLICATIONS

This application is a continuation of application Ser. No. 09/783,679, filed Feb. 14, 2001 now U.S. Pat. No. 6,594,346, which is a continuation-in-part of application Ser. No. 09/288,420, filed Apr. 8, 1999, now U.S. Pat. No. 6,233,314, which is a continuation of application Ser. No. 08/925,558 filed Sep. 8, 1997, now U.S. Pat. No. 5,909,482.

STATEMENT REGARDING FEDERALLY SPONSORED RESEARCH OR DEVELOPMENT

Not applicable.

BACKGROUND OF THE INVENTION

The present invention relates to the general field of telephone communications. In more particular, the invention relates to systems to assist telephone communications by those persons who are deaf, hard of hearing, or otherwise have impaired hearing capability.

Most modern human communications in both social and business environments takes place through sound communications. Yet within modern society there are many persons who have attenuated hearing capability. To assist those persons in making use of our telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a key board and a display as well as a specific type of modem, to acoustically or directly couple to the telephone line. Modem TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology based on digital electronic components. Accordingly, the Baudot protocol was constructed for a set of constraints which are no longer relevant to present date devices. The original Baudot protocol was a unidirectional or simplex system of communication conducted at 45.5 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate from voice to digital electronic forms of communication.

A limitation in the effectiveness of current relay protocols is the necessity for the call assistant simply to type what is said. Typical call assistants can usually type reasonably well, typically in the range of 40 to 60 words per minute. While systems exist which permit the digital encoding of verbal communications at a faster rate, such as court stenography used in the legal system, such systems require extensive special training and are impractical for the numerous call assistants required by the relay systems in operation today. This limitation on the speed of conversion from speech to digital communications hampers the effective flow of communication in a relay call between the hearing person and a deaf person, since most hearing people speak at a rate which is higher than most call assistants can type. In addition, since conventional Baudot communications is unidirectional, the flow of conversation in a relay assisted communication session can be somewhat awkward. For example, first the hearing person must voice a statement or question. Then the calling assistant must type that statement or question, which is then transmitted at Baudot speeds, which are slower than normal human voice communication, to the deaf person. The deaf person waits until the entire statement or question is transmitted to him or her, after which he or she composes a response and types it in at his or her TDD. Then the communication flows backward to the call assistant who must voice to the hearing person what the deaf person has typed at his or her terminal. This process enables a degree of two-way communication between a deaf person and a hearing person, but the system tries the patience of the hearing person, since it is typically not conducted at a pace anywhere close to normal human communications.

BRIEF SUMMARY OF THE INVENTION

The present invention is summarized in that a relay system to facilitate the translation of information and communication between deaf and hearing persons includes a call assistant who re-voices the words of the hearing person which are spoken to the call assistant. The words spoken by the call assistant are recognized by a speech recognition computer program which has been trained to the voice pattern of the call assistant, such that the words are promptly translated into text and formatted into a high speed digital communication protocol. That high speed digital communication message is then transmitted electronically promptly by telephone to a visual display accessible to the deaf person.

It is an advantage of the invention described herein that the call assistant does not have to type most, if any, of the words spoken by the hearing person in the communication session so that the overall speed of communications from the hearing person to the deaf person is dramatically increased.

It is an object of the present invention that the design and utilization of a relay operated in accordance with the protocols described herein permits the introduction of small hand-held personal interpreter which will enable on the spot communications between deaf persons and hearing persons wherever the deaf persons might go.

Other objects, advantages and features of the present invention will become apparent from the following specification when taken in conjunction with the accompanying drawings.

DETAILED DESCRIPTION OF THE INVENTION

The present invention involves developments in the improvement of computer assisted relay services. These developments are based upon using voice recognition software, operated by a call assistant (a "CA"), to assist in the voice to text translation inherent in providing relay services. The CA re-voices the words spoken by a hearing user, with the voice recognition software translating the voice into text, so that near to simultaneous voice and text of the voice can be delivered to an assisted user.

The re-voicing relay has its first implementation in providing voice to text transcription services for the deaf. However, the relay voice to text transcription service has use for users other than those who are deaf. It is envisioned that there are a number of hearing or partially hearing users who would have reason to benefit from voice to text transcription services. For example, a device known as a captioned telephone, described below, permits telephone users who have hearing difficulty in use of the telephone by providing a near-simultaneous text transcription of telephone conversations, the text being provided by a relay. Relay voice to text service might also be useful for any application in which it is desired to supplement voice communications by a text transcription of the voice spoken on the telephone. Thus, while the operation of the relay will sometimes be described here by referring to an "assisted user," who may be deaf or hard of hearing, but who also may be a normally hearing person who simply wants text assistance for some reason. The user at the other end of the line will be referred to here as the hearing user, simply for the purpose of having something to call that person, even though both users may be hearing.

Introduction to Re-voicing Relay.

The computer-assisted relay system is intended to provide more conversation-like performance of voice to text interpreting for translating between an assisted user and a hearing user. The method of operating the relay described herein is applicable to the broad TDD community, and also to all the applications in which a relay might be normally used. However, since the advantages of this system are most clear in view of its usefulness in enabling the advent of the truly portable personal interpreter for the deaf, a diversion to discuss what this device is and how the relay may enable its practical use is appropriate here.

Personal Interpreter.

Figure 2:
FIG. 2 is an exterior view of a personal interpreter enabled by the relay of FIG. 1.

Shown in FIG. 2 is an illustration of what a personal interpreter 10 can look like. This would be a small hand held device typically the size of a small hardbound book. It would have a keyboard of minimal size, but useable by a deaf person who can type. It would have a multi-line display, but the display could be any size that conveniently fits in the case of the device. The device would also have a key or switch which would initiate its operation.

Figure 3:
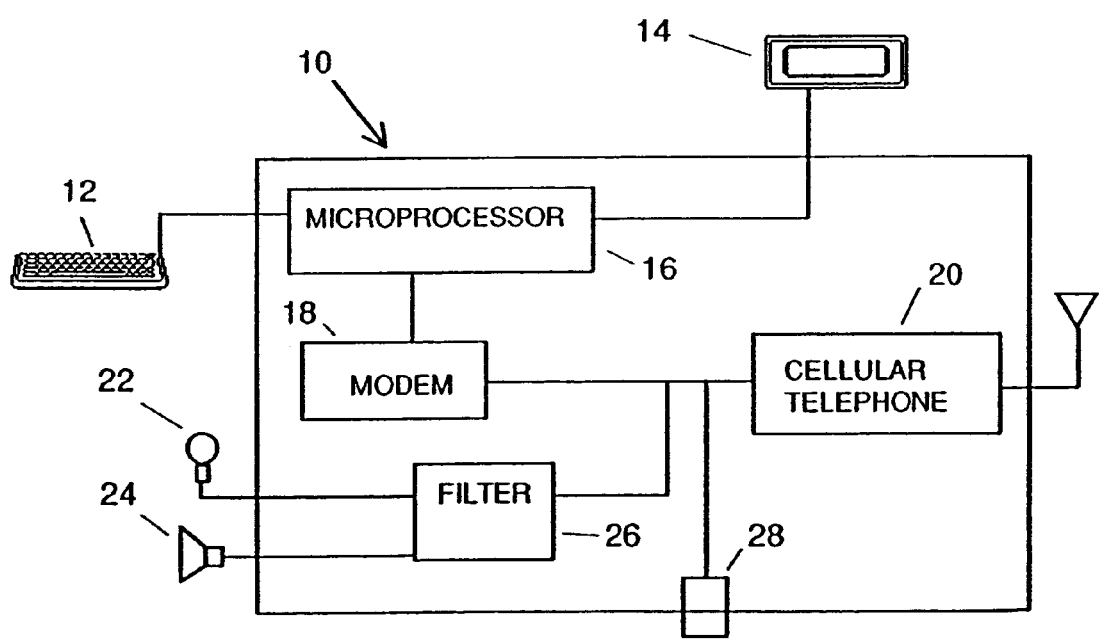
FIG. 3 is a schematic block diagram of the personal interpreter of FIG. 2.

Shown in FIG. 3 is a schematic block diagram of the internal mechanics of the personal interpreter. The personal interpreter keyboard shown at 12 and its display as shown at 14. Inside the interpreter itself is a microprocessor shown at 16. Not shown, but included within the personal interpreter, would be the appropriate memory and interface devices so as to allow the microprocessor to be programmed and to operate the personal interpreter and perform its functions, in a manner well known in the art. Also inside of the personal interpreter is a modem 18. The modem 18 is preferably a modem specifically designed for interface with the deaf telecommunications system. Most telecommunications with the deaf community are conducted using a Baudot type code. It is preferred that the mode be designed to use the enhanced form of Baudot communication known as "Turbo Code" (Ultratec), which is generally described in U.S. Pat. Nos. 5,432,837, 5,517,548, and 5,327,479, the disclosure of which is hereby incorporated by reference. It is even more preferred that the modem use a new variant of Turbo Code, one which uses higher carrier frequencies (in the range of 3000–3500 hertz) and a faster baud rate (over 100 baud). The output of the modem is preferably wired to a cellular telephone 20 included within the case of the personal interpreter 10. The cellular telephone 20 has a suitable antenna provided on it so that it may dial a cellular telephone network by radio frequency communications of the type normally conducted by cellular telephones. The personal interpreter also includes jack 28 to connect to a conventional wired or land-line telephone line as well. The personal interpreter also include a microphone 22 and a speaker 24. A filter 26 connects the speaker 24 and the microphone 22 to the telephone 20.

A brief description of the operation and functionality of the personal interpreter reveals the dramatic improvement and convenience and portability that this device gives to deaf people. A deaf user could go into an establishment, be it a government office or retail facility, in which there are only hearing persons. The deaf person would carry with him or her the personal interpreter 10. The deaf person would then place the personal interpreter 10 upon a counter or other surface, open it up, and press the initiation key or start button. The microprocessor 16 and modem 18 of the personal interpreter then power up and act in many ways like a normal TDD device operating in telecommunication standard, such as Turbo code. However, there is one critical difference. The start or initiation key further causes the microprocessor 16 of the personal interpreter to dial a relay to set up a relay communication session and includes in its communication with the relay a message, using the enhanced command features available in advanced telecommunication protocols, such as Turbo Code, to initiate a special format of relay call adapted for the personal interpreter. Other codes which permit command functions, such as ASCII or CC ITT, could also be used. The first operation is to activate the cellular telephone and direct the cellular telephone to dial the number of a relay operating in accordance with the method of the present invention. The cellular telephone dials the relay. Obviously, no wired connection is required to allow the cellular telephone function to establish a telephone connection with the remote relay, but alternatively the jack 28 to a conventional telephone line could be used. In addition, when the relay answers the telephone connection, the microprocessor 16 of the personal interpreter 10 is instructed to provide command codes to the remote relay. These command codes, a feature possible through the use of Turbo Code, permits the personal interpreter to tell the relay that this is a personal interpreter-type relay communication session. All of this can happen in the time necessary to initiate the cellular call, perhaps two to ten seconds.

Then, the deaf person can use the personal interpreter to translate words spoken by hearing persons in the presence of the personal interpreter into visually readable text. This is done by the personal interpreter 10 through an unseen relay. Words spoken by the hearing persons in the presence of the personal interpreter 10 are picked up by the microphone 22. Those words are then transmitted through the cellular telephone 20 to the remote relay. The relay, operating as will be described below, then immediately transmits back, in enhanced Turbo Code, a digital communication stream translating the words that were just spoken. The words are received by the modem 18, and the microprocessor 16 in the personal interpreter 10, and it is displayed promptly upon the display screen 14. If the deaf person can speak, he or she may then answer the hearing person with a spoken voice, or, the deaf person may alternatively type upon the keyboard 12. If the deaf user types on the keyboard 12, the personal interpreter transmits the communication by digital communication to the relay. The call assistant at the relay then reads and speaks the words typed by the deaf user which are transmitted to the speaker 24 contained in the personal interpreter into a voice communication which can be understood by the hearing users. The filter 26 filters out the digital communication frequencies from the sound generated by the speaker 24. Thus, in essence, the deaf person has a personal interpreter available to him or her at all times of the day or night wherever the deaf person is within the range of the cellular telephone system. Also, because the relay is preferably operating in accordance with the fast translation methodology described below, a very conversation-like feel can occur in the communication session between the deaf user and the hearing persons in the presence of the personal interpreter 10. In order for this communication session to be satisfactory to the hearing users as well as the deaf person, however, the relay must operate exceedingly rapidly. It is, in part, to meet the need for the exceeding rapidity of this conversational style of communication that the relay protocol of the present invention has been designed.

Re-voicing Relay.

Figure 1:
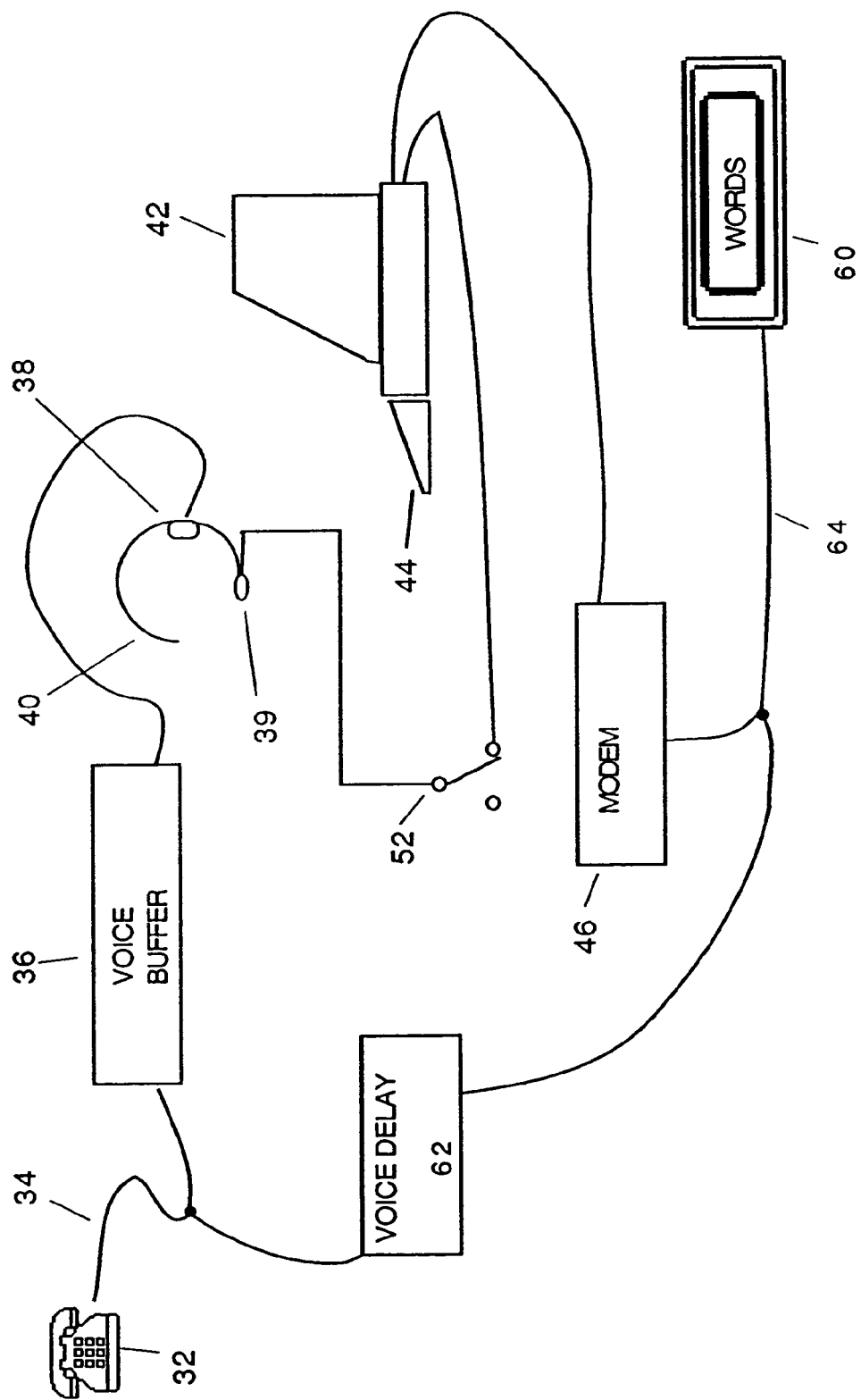
FIG. 1 is a schematic block diagram of a re-voicing relay.

Shown in FIG. 1 is a relay intended to provide the voice to text capability to support the personal interpreter, and which can also support other voice to text services to provide services for assisted users. FIG. 1 is intended to show, in schematic fashion, how such a relay system can be set up. Shown at 32 is a telephone of a hearing person. Instead of a telephone of a hearing person, the input could also be the microphone of the personal interpreter 10 shown in FIGS. 2 and 3. The telephone of the hearing person 32 is connected through a telephone line 34 to a voice input buffer 36 at the relay. The telephone line 34 can be an actual physical land line, i.e. two pair between the telephones, or can be a cellular or other over-the-air telephone linkage or can be an internet protocol digital connection. The voice input buffer 36 is a simple buffer to ensure temporary capture of the voice in the event that the call assistant gets behind and needs to buffer or delay the voice of the hearing person. In any event, the output of the input voice buffer 36 is provided to a headset 40 where earphones 38 produce the sound of the remote speaking person in the ear of the call assistant. The call assistant is wearing the headset 40 and sitting at a computer 42 capable of communicating in an enhanced Baudot communication, such as Turbo Code or whatever other code protocol is being used. However, typically the call assistant does not type the words which the call assistant hears in his or her earphone 38. Instead, the call assistant then speaks the words which he or she hears in the earphones 38 into a microphone 39 in the headset 40. The microphone 39 on the headset 40 is connected to transmit the voice of the call assistant to the computer 42 at which the call assistant sits.

The computer 42 has been provided with a voice recognition software package which can recognize the spoken voice of the call assistant and immediately translate words spoken in that voice into a digital text communication stream. It is a limitation of currently available speech recognition software that the software must be trained or adapted to a particular user, before it can accurately transcribe what words the user speaks. Accordingly, it is envisioned here that the call assistant operates at a computer terminal which contains a copy of a voice recognition software package which is specifically trained to the voice of that particular call assistant. It is also important that the voice recognition system be capable of transcribing the words of the voice of the call assistant at the speed of a normal human communication. It has been found that a recently available commercial voice recognition package from Dragon Systems, known as "Naturally Speaking," is a voice recognition software which will accomplish this objective and which will translate to digital text spoken words of a user at the normal speeds of human communication in conversation when operating on conventional modern personal computers. A voice recognition software system known as "Via Voice" from IBM provides similar functionality.

The computer terminal 42 of the call assistant then translates the text created by the voice recognition software to a modem 46 out through a telephone line 48 back to the display 50 located adjacent to the assisted person. The display 50 can be a conventional TDD located at the home of the remote assisted user, or can be the display 14 of the personal interpreter 10, or can be any other display or text capture device used by an assisted user.

For reasons that will become apparent, there is also a connection from the microphone 39 of the headset 40 of the call assistant to the incoming telephone line 34 through a switch 52. The switch 52 can physically be an electrical switch located between the microphone 39 and the telephone lines 34 and the computer 42 or, as an alternative, it can be a software switch operating in the computer 42 which passes the voice of the hearing user through to the telephone lines as voice, or not, under conditions which are selected by the call assistant, by choices he or she makes at the keyboard 44 of the computer 42. The switch 52 is functionally a single pole double throw switch although, of course, if this function is performed by the computer it will be a logical not a physical switch. In the simplest embodiment, the switch 52 is a simple single pole dual throw switch readily accessible to the call assistant which passes the voice of the call assistant from the microphone either out onto the telephone line 34 or to the computer 42.

It is a further enhancement to the operation of the relay constructed in accordance with the present invention that the earphones 38 have noise attenuating capability. Noise canceling earphones are commercially available today or, for this purpose, the computer 42 can be provided with noise canceling sound generation software which would create sound transmitted to the earphone 38 so as to cancel the sounds of the call assistant's own voice. The noise attenuation or cancellation avoids distracting the call assistant, since he or she would then be less distracted by the words that he or she has spoken, and thus would be less likely to be distracted from the concentration of the task of re-voicing the sounds of the voice heard in the call assistant's ear.

Similarly, another option which would be advantageous is that the software providing for the creation of the digital text string by voice recognition be buffered in its output flow to the modem 46. Before the computer 42 would pass the data on to the modem 46, the data would first be displayed on the computer screen of the computer 42 for review by the call assistant. The purpose of this option would be to permit the call assistant to use the keyboard to spell or correct hard-to-spell words, or to create corrections of any misinterpretations created by the voice recognition software, from the words spoken by the call assistant. It is anticipated that if such an option is utilized, it would require fairly infrequent use of the keyboard by the call assistant, since frequent use would clearly slow down the through-put of the communications.

The relay of FIG. 1 can operate with normal TDDs or with a personal interpreter as shown in FIGS. 2 and 3 and can also be used to support the operation of the captioned telephone described below. In either event, the hearing person speaks in the telephone 32 and the words are transmitted through the telephone line 34 to the voice buffer 36. The voice buffer 36, again operating under the control of the call assistant, would buffer the voice signals from the hearing user as needed for the call assistant to keep up. The call assistant would hear the voice of the hearing user through the ear piece 38 and then would re-voice those same words into the microphone 39. The words that the call assistant speaks into the microphone 39 would be fed to the computer 42 where the voice recognition software, trained to the voice of the call assistant, would translate those words into a digital text stream. The digital text stream would be turned into a digital communication stream by the modem 46 and passed on the telephone line 48 to a display 50 which can be observed by the assisted user. Experience has shown that using currently available technology the delay between the time the hearing user speaks into the telephone 32 and the time the words appear on the display 50 of the assisted user is a modest number of seconds.

In the reverse, when a non-speaking assisted user types onto his or her telecommunication device, the digital signals are transmitted to the computer 42 which displays them for the call assistant who then voices those words into the microphone 39 which words are then transmitted onto the telephone line 34. Note that the presence of the switch 52 is therefore important in this mode. Since the voice of the call assistant serves two different functions in the operation of this system, the signal on the call assistant's voice must be switched so that the hearing user 32 only hears the voice for the communications which are intended to be directed to that person. The switch 52 allows for the voice of the call assistant only to be directed to the hearing person at the appropriate times.

Note that if the relay of FIG. 1 is used to facilitate a translation based on a personal interpreter such as that shown in FIGS. 2 and 3, there will be only one telephone line between the personal interpreter and the call assistant. In essence, in a modification of FIG. 1, the telephone 32 and the display 50 would both be within the personal interpreter 10. There would be only one telephone line, a cellular link, between the personal interpreter 10 and the call assistant. This telephone line may be a virtual, as opposed to physical linkage between the parties, as for example a linkage using internet protocol over the internet. Note therefore that the voice of the call assistant and the digital communications created by the computer 42 would then travel on that same telephone linkage to and from the personal interpreter 10. It is therefore important for this embodiment that the personal interpreter 10 have appropriate filtering (i.e. the filter 26) to filter out the digital communication carrier frequencies of the digital communications protocol, so that they are not heard by hearing listeners in the presence of the personal interpreter 10. The telephone line must still carry voice signals, however, so that the spoken words articulated by the call assistant in response to digital instructions from the deaf user can be properly broadcast by the speaker contained within the personal interpreter.

The provision for filtering of the digital frequencies can be done in any number of ways with two being the principal preferred methodologies. If Turbo Code communications are conducted at the conventional Baudot frequencies of 1400 and 1800 Hertz, the personal interpreter 10 could be provided with notch filters 26 to filter out signals at those particular frequencies. It has been found that such notch filters still permit the transmission of audible and understandable human speech, even if they filter at those particular frequencies. As an alternative, it is possible to change the Baudot frequencies to those which are much higher, such as frequencies of 3000 to 3500 Hertz. If this alternative is selected, the personal interpreter 10 is then provided with a low pass filter which permits low frequency sounds to go to the speaker to be broadcast into the environment of the personal interpreter, while high frequencies are excluded.

It is also specifically envisioned that the filter of text communications signals from the voice signal can be done digitally or logically rather than by analog filter. For example, it is possible to implement the modem at site of the assisted user using a digital signal processing, or DSP, integrated circuit. Such a DSP chip can be programmed to recognize to separate voice signals from text communications signals and to pass along only the voice signals to the speaker at the location of the assisted user. It is also contemplated that the telephone linkage between the relay and the assisted user could be a digital connection rather than an analog telephone line. For example, the linkage between the relay and the assisted user could be a digital wireless linkage or an internet protocol linkage, wired or wireless. In either of these instances, the appropriate protocol calls for the transmission of packets of digital data, the packets being marked to indicate the type of information carried in the packets. The packets might contain, for example, voice signals which have been digitized or might contain simple digital information representing the text string of a conversation. In the instance of such a digital packet type communication protocol, the filtering out of the digital text information could be implemented simply by only converting the packets marked as voice back into sound. Packets marked as containing digital information would be used to recover the text information for display to the assisted user.

Captioned Telephone.

Figure 4:
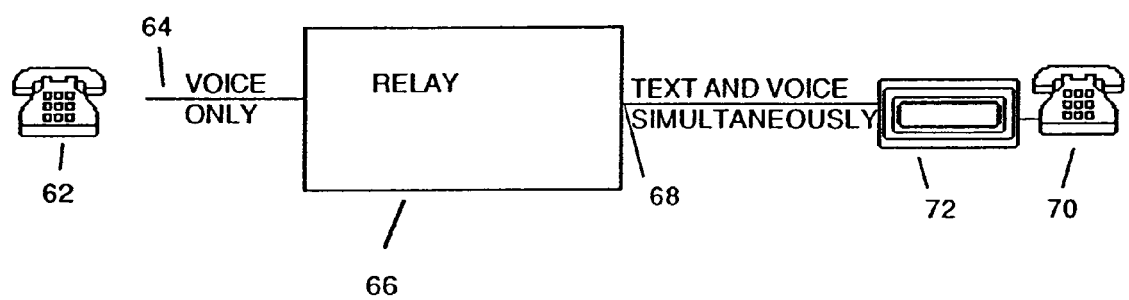
FIG. 4 illustrates the operation of a captioned telephone service supported by a relay.

Shown in FIG. 4 is an illustration of how a typical telephone call involving a captioned telephone would be set up. The hearing user at telephone 62 communicates through a telephone line 64 with the relay, indicated at 66. The relay, a re-voicing relay, communicates through a telephone line 68 with the assisted user. At the site of the assisted user is a telephone 70 used by the assisted user and also a captioned telephone device 72. The telephone 70 is conventional. The captioned telephone device 72 is constructed to accomplish two objectives. One objective is to filter, or separate, the digital signals carrying the text information from the voice signal. The other objective is to take the digital signals and create a visual display of the text information for the assisted user. This device is thus intended to assist the user to understand a greater portion of the conversation by providing a visually readable transcription of the text of the telephone conversation so that the assisted user can read any words that he or she cannot hear properly.

While the utilization of the re-voicing relay is particularly intended to be helpful for the personal interpreter and captioned telephone applications, it is not intended to be limited to those particular applications. For example, the voice to text capability of the re-voicing relay makes the use of such a relay attractive for some business purposes, such as creating a text record of a business negotiation or interview session, conducted over or merely in the presence of a telephone. If the call assistant is a simultaneous translator from one spoken language to another, the relay can be used to conduct language translations assisted by text transcriptions. The voice delay relay can be used to present text nearly simultaneously to voice for such applications.

In the implementation of a relay providing captioned telephone service, the relay transmits both a digital text message stream and the voice of the hearing user over a telephone connection to the station of the assisted user. It is to be understood, however, that a conventional telephone single line connection is only one example of a telephonic connection that can be used in this arrangement. Digital wireless connection, or PCS connection, or even internet protocol wired or wireless connection can be used to connect the relay to the assisted user. The digital or analog nature of the telephonic connection is not critical, the only criticality being that the connection is capable of transmitting voice and text simultaneously from the call assistant to that user.

It is to be understood that the present invention is not limited to the particular illustrations and embodiments disclosed above, but embraces all such modified forms thereof as come within the scope of the following claims.

I claim:

1. A method of operating a relay system using a call assistant to facilitate communication between a hearing user and an assisted user using a single telephone connection connecting to a personal interpreter located in the presence of both the hearing and assisted users, the hearing user speaking words in voice, the method comprising the steps of transmitting the voice of the hearing user when speaking over the single telephone connection to the ear of the call assistant;

the call assistant speaking in voice the same words that the call assistant hears spoken by the hearing user into a microphone connected to a digital computer;

the digital computer using voice recognition computer software trained to the voice of the call assistant to translate the words spoken by the call assistant into a digital text message stream containing the words spoken by the call assistant;

transmitting both the digital text message stream and the voice of the hearing user over the single telephone connection back to the personal interpreter of the assisted user;

displaying the digital text message stream by the personal interpreter within sight of the assisted person; and transmitting the voice of the hearing user to the personal interpreter which reproduces that voice for the assisted user.

* * * * *